United States Patent
Cho

(10) Patent No.: US 8,142,049 B2
(45) Date of Patent: *Mar. 27, 2012

(54) LIGHTING DEVICE FOR DISPLAY DEVICE AND DISPLAY DEVICE

(75) Inventor: Shiyoshi Cho, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 329 days.

This patent is subject to a terminal disclaimer.

(21) Appl. No.: 12/524,173

(22) PCT Filed: Nov. 21, 2007

(86) PCT No.: PCT/JP2007/072539
§ 371 (c)(1),
(2), (4) Date: Jul. 23, 2009

(87) PCT Pub. No.: WO2008/111265
PCT Pub. Date: Sep. 18, 2008

(65) Prior Publication Data
US 2010/0110664 A1    May 6, 2010

(30) Foreign Application Priority Data
Mar. 9, 2007  (JP) .................................. 2007-060394

(51) Int. Cl.
*F21V 21/00* (2006.01)
(52) U.S. Cl. .................... 362/217.1; 362/623; 349/58
(58) Field of Classification Search ............... 362/217.1, 362/611, 613–614, 632–634; 349/58
See application file for complete search history.

(56) References Cited

U.S. PATENT DOCUMENTS

| 5,560,698 | A | 10/1996 | Okano | |
|---|---|---|---|---|
| 2006/0044780 | A1 | 3/2006 | Kim | |
| 2006/0103774 | A1* | 5/2006 | Han et al. | 349/58 |
| 2007/0058108 | A1* | 3/2007 | Uehara et al. | 349/86 |

FOREIGN PATENT DOCUMENTS

| JP | 2004-220980 A | 8/2004 |
|---|---|---|
| JP | 2006-066360 A | 3/2006 |

OTHER PUBLICATIONS

Official Communication issued in International Patent Application No. PCT/JP2007/072539, mailed on Dec. 18, 2007.
Cho; "Lighting Device for Display Device and Display Device"; U.S. Appl. No. 12/524,174, filed Jul. 23, 2009.
Cho; "Lighting Device for Display Device and Display Device"; U.S. Appl. No. 12/524,178, filed Jul. 23, 2009.
Cho; "Lighting Device for Display Device and Display Device"; U.S. Appl. No. 12/524,163, filed Jul. 23, 2009.

* cited by examiner

*Primary Examiner* — Stephen F Husar
*Assistant Examiner* — Meghan Dunwiddie
(74) *Attorney, Agent, or Firm* — Keating & Bennett, LLP

(57) ABSTRACT

A lighting device for a display device, includes a light source and a chassis arranged to cover the light source. The chassis is defined by a plate-shaped member having a reticulated structure. Thus, the lighting device for a display device, capable of preventing or suppressing beat tones generated on a lamp housing member, is provided without increasing the thickness of the device and with a simple structure.

14 Claims, 10 Drawing Sheets

LIGHTING DEVICE FOR DISPLAY DEVICE AND DISPLAY DEVICE

BACKGROUND OF THE INVENTION

1. Field of the Invention

The present invention relates to a lighting device for a display device and a display device including a lighting device.

2. Description of the Related Art

In a display device having non-luminous optical elements as typified by a liquid crystal display device, a backlight device is provided on the backside of a display panel such as a liquid crystal panel, so as to illuminate the display panel (as shown in JP-A-2006-66360, for example).

JP-A-2006-66360 discloses a backlight assembly that includes lamps and a housing member for holding the lamps. In the backlight assembly thus including lamps and a housing member for holding the lamps, beat tones may be generated during dimming control of the lamps, due to the second and third harmonics of a dimming control frequency.

There are various theories as to how the beat tones are generated. For example, one of the theories suggests involvement of current leakage from the lamps to the housing member. That is, the beat tones may be caused by vibration of the housing member caused by leakage current from the lamps.

JP-A-2006-66360 discloses that bulging portions or recessed portions corresponding to the lamps are formed on the housing member in order to prevent current leakage between the lamps and the housing member. However, the beat tones cannot be reduced adequately even according to this construction. Moreover, if the bulging or recessed portions are provided, the housing member may be prone to having increased thickness due to the bulging or recessed portions. This is a significant problem, particularly where thinning of liquid crystal display devices is required.

SUMMARY OF THE INVENTION

Accordingly, preferred embodiments of the present invention provide a lighting device for a display device capable of preventing or suppressing beat tones generated on a housing member or chassis that holds lamps or light sources, without increasing the thickness of the device and with sufficient strength of the housing member or chassis. In addition, preferred embodiments of the present invention provide a high-quality and highly-reliable display device including the lighting device.

A lighting device for a display device according to a preferred embodiment of the present invention includes a light source and a chassis arranged to cover the light source, in which the chassis includes a plate-shaped member having a reticulated structure.

The inventor of preferred embodiments of the present application has repeatedly considered measures for beat tones, and consequently the beat tones can be substantially eliminated when the chassis is defined by a plate-shaped member having a reticulated structure. This may be due to major reduction of current leakage from the light source to the chassis. That is, when the chassis thus has a reticulated structure, the distance between the light source and the chassis can be infinitely large at each opening section of the reticulated structure, and the area "S" of the chassis (i.e., the area obtained by subtracting the areas of opening sections from the area of the whole chassis) can be small. Accordingly, the leakage current may be substantially eliminated, which is expressed by the following formula (1):

$$I = 2\pi f \epsilon C V = 2\pi f \epsilon (S/d) V \quad \text{formula (1)}$$

where "I" is the amount of leakage current, "C" is the stray capacitance, "V" is the potential difference between the light source and the chassis, "S" is the area of the chassis, and "d" is the distance between the light source and the chassis.

JP-A-2006-66360 discloses a construction, also as a measure against the current leakage, in which bulging portions or recessed portions corresponding to the lamps or light sources are formed on the housing member or chassis. However, the beat tones cannot be sufficiently eliminated, when the above bulging or recessed portions are provided as a measure for beat tones. This may be because the slightly longer distance between the light sources and the chassis, caused by the bulging or recessed portions, fails to result in sufficient elimination of the beat tones. Further, in the construction thus including bulging or recessed portions, the chassis can vibrate at the bulging or recessed portions.

In contrast, according to a preferred embodiment of the present invention, the plate-shaped member having a reticulated structure is unlikely to generate vibration due to structural reasons, and therefore the beat tones can be substantially eliminated. That is, preferred embodiments of the present invention preferably use the reticulated structure but not merely as a measure for current leakage. A metallic plate construction of a chassis provided solidly on its entire surface may contribute to generating beat tones, and accordingly the chassis preferably has a reticulated structure in order to achieve elimination of the beat tones. Particularly, preferred embodiments of the present invention contribute greatly to reduction in size of the lighting device for a display device, because bulges on the chassis, which are generated due to the bulging or recessed portions as in JP-A-2006-66360, are prevented.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be hereinafter explained with reference to the drawings.

Figure 1:
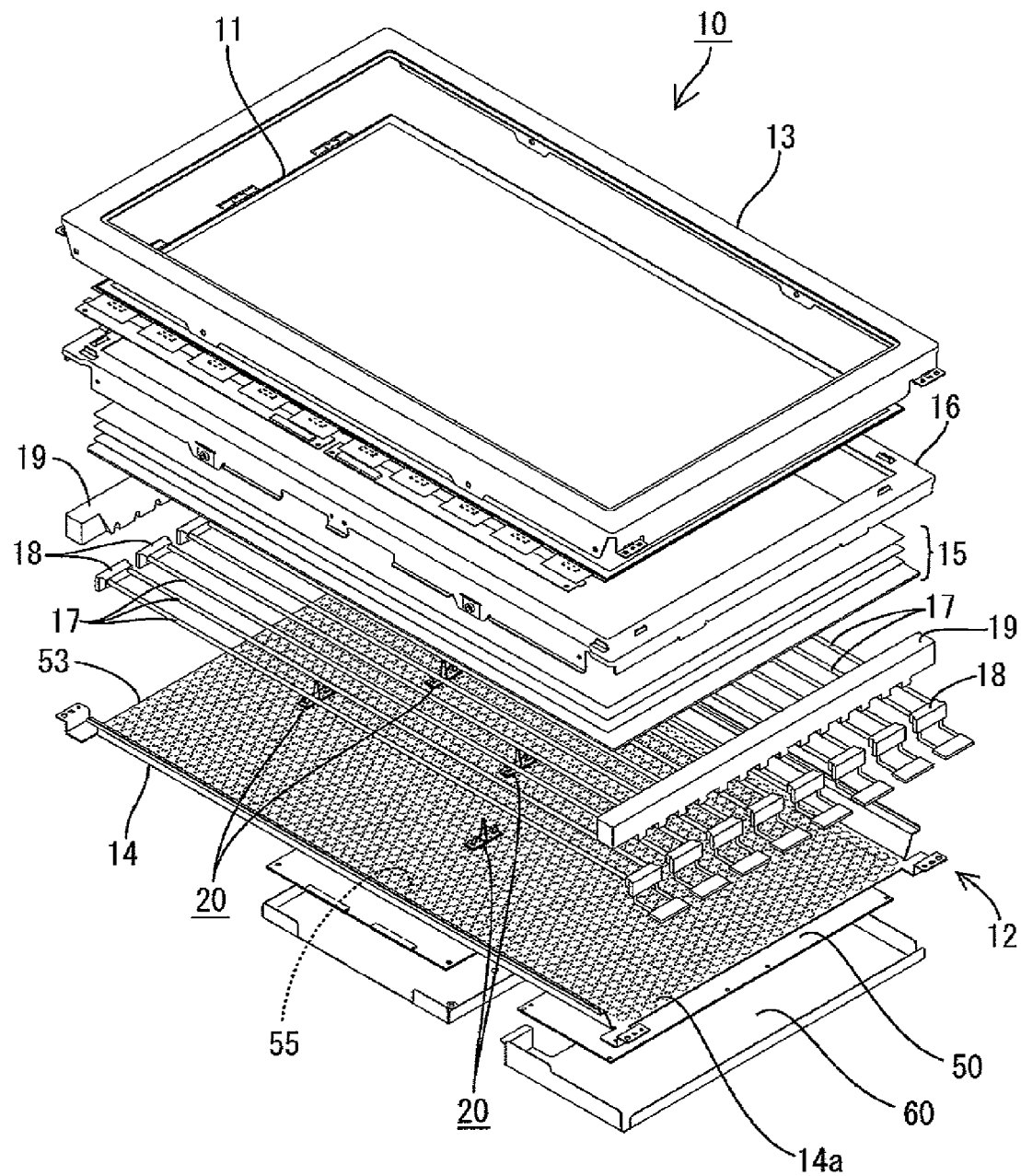
FIG. 1 is an exploded perspective view showing the general construction of a liquid crystal display device according to a preferred embodiment of the present invention.
Figure 2:
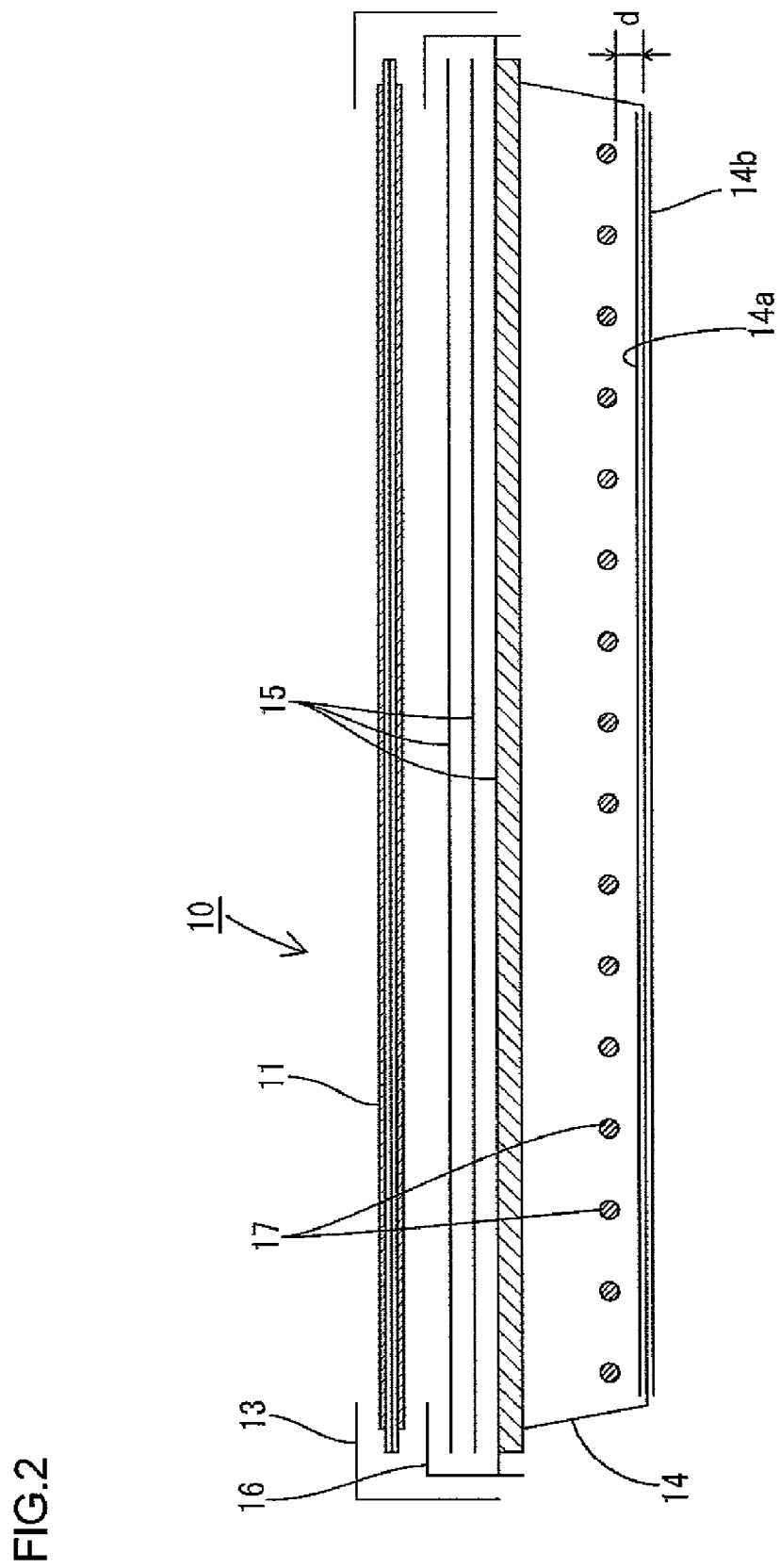
FIG. 2 is a sectional view of the liquid crystal display device shown in FIG. 1.
Figure 3:
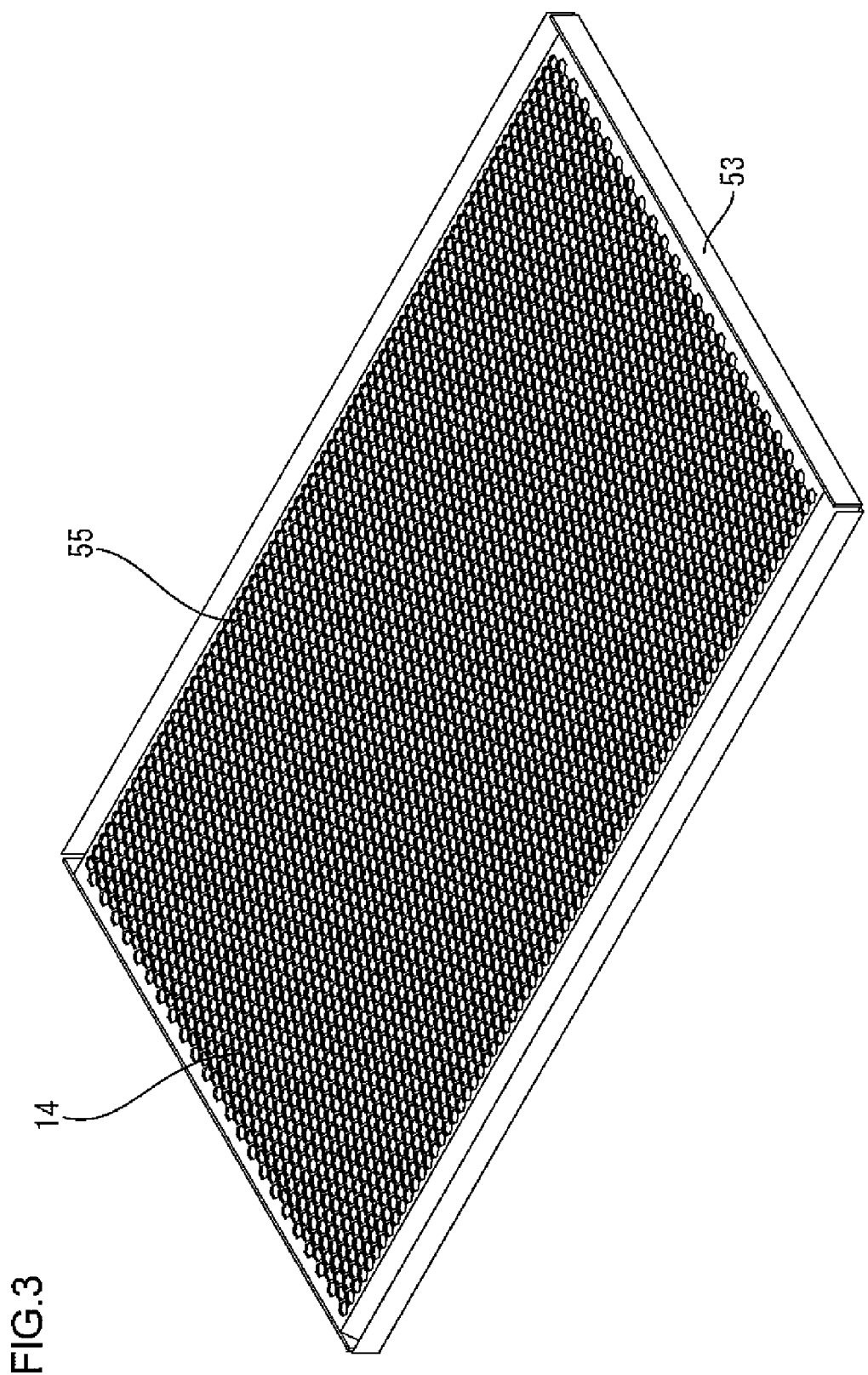
FIG. 3 is a perspective view showing the general construction of a chassis included in the liquid crystal display device shown in FIG. 1.
Figure 4:
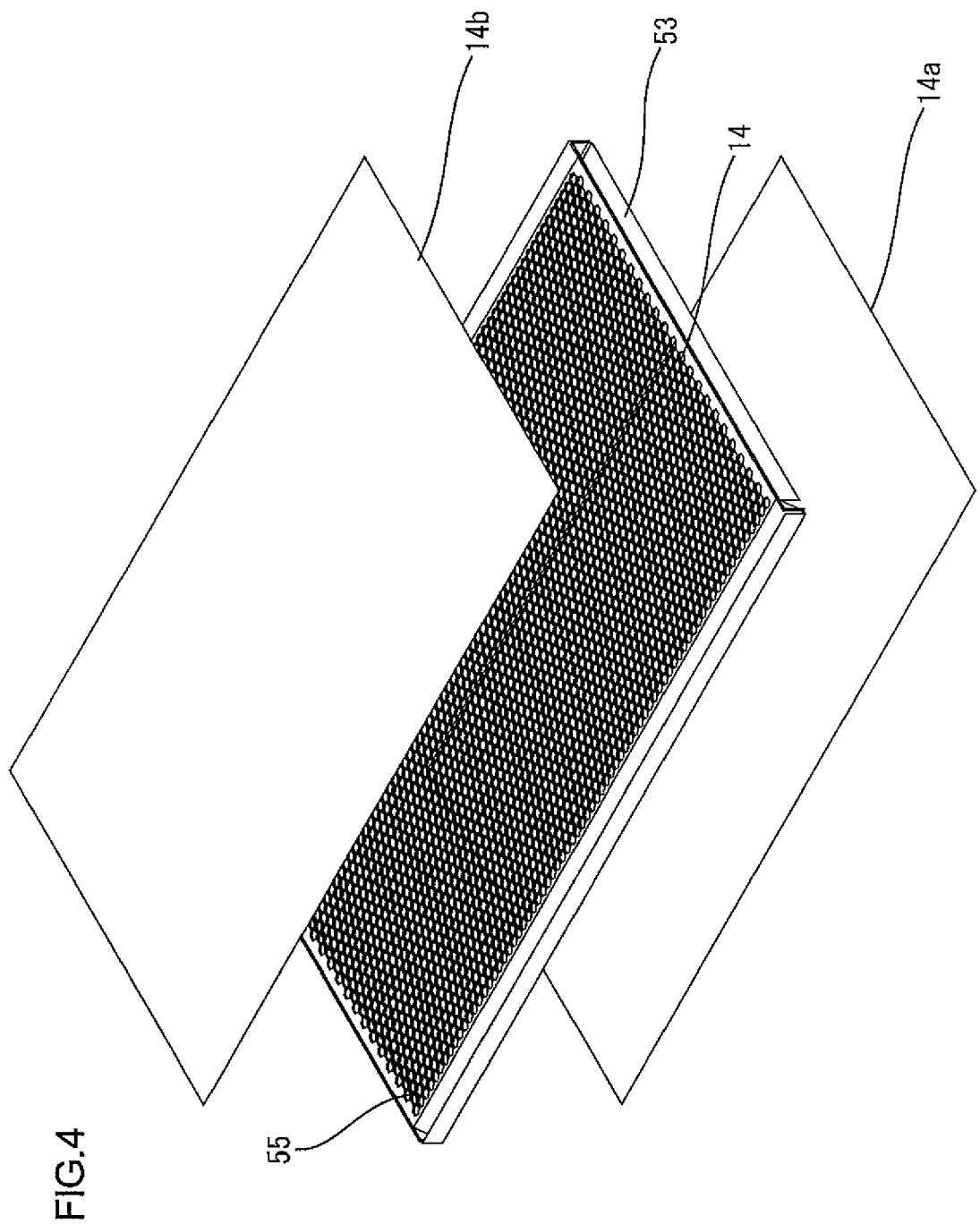
FIG. 4 is a perspective view separately showing sheets and the like to be attached to the chassis.
Figure 5:
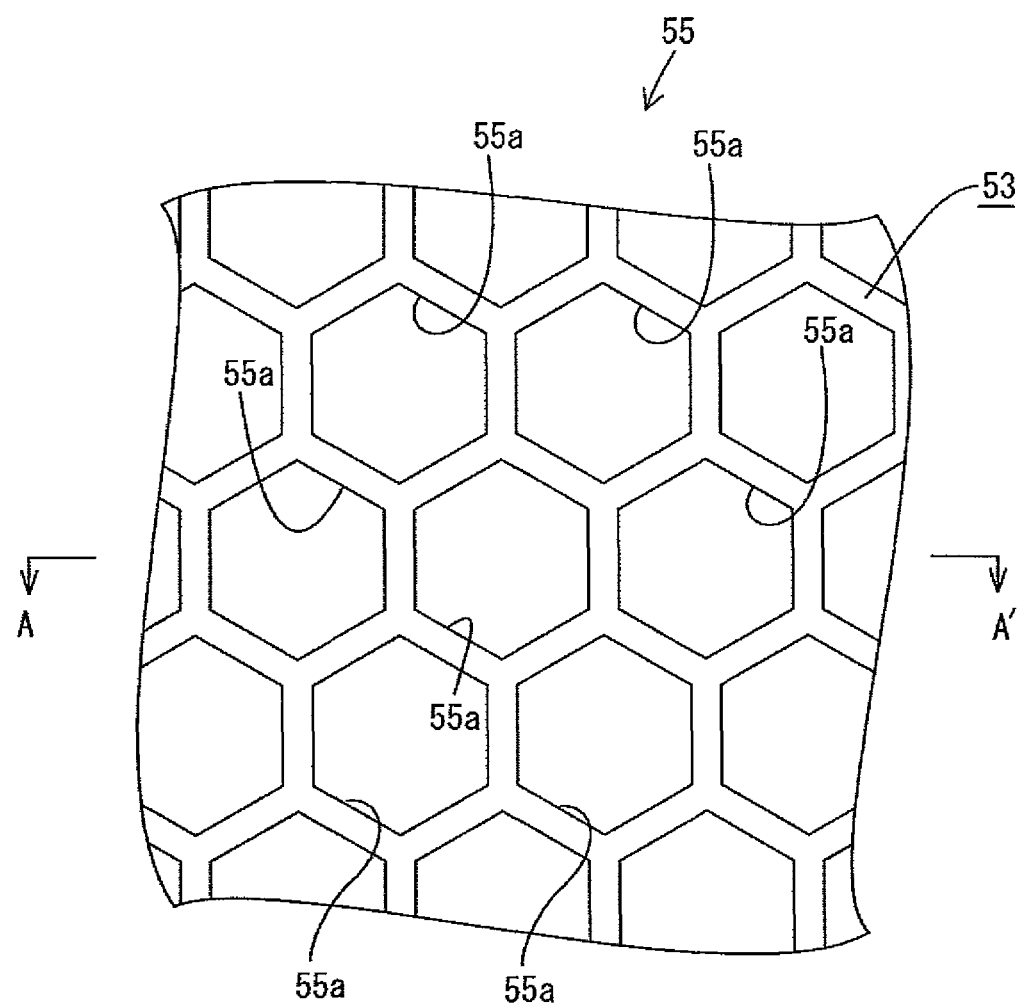
FIG. 5 is an enlarged plan view showing the construction of a characteristic portion of the chassis.
Figure 6:
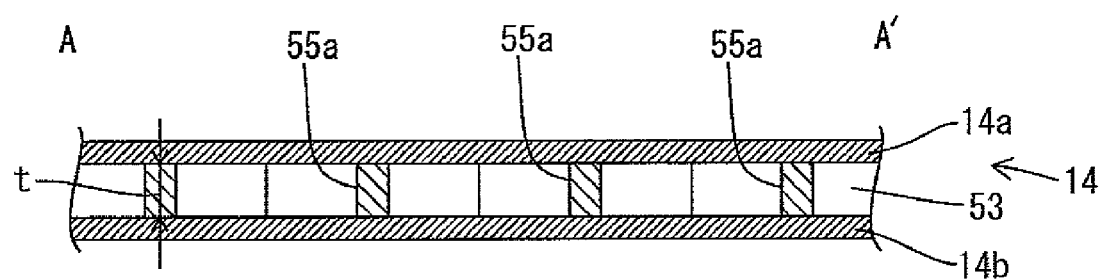
FIG. 6 is a sectional view of FIG. 5 along the line A-A'.
Figure 7:
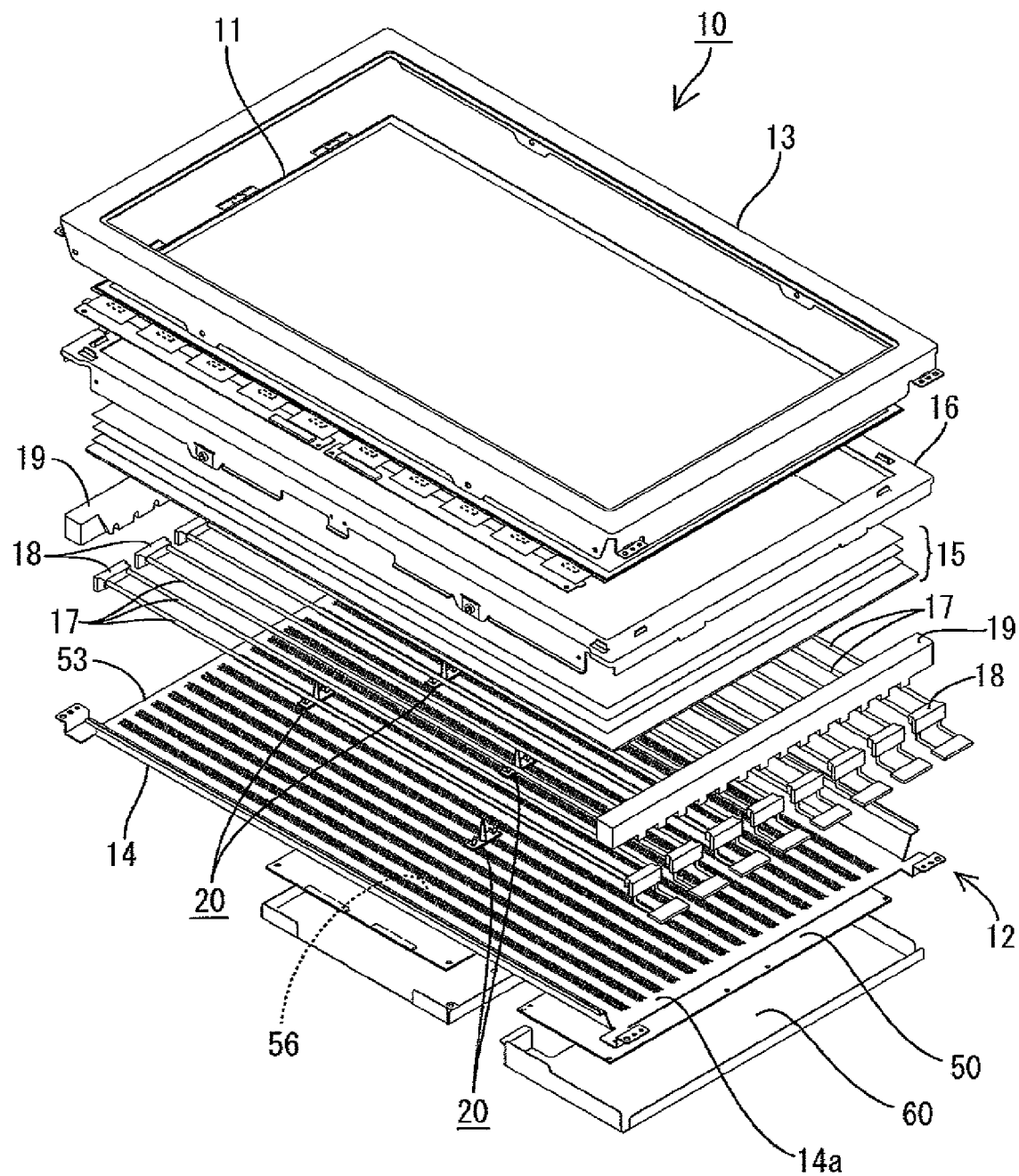
FIG. 7 is an exploded perspective view showing the general construction of a liquid crystal display device as a modification of a preferred embodiment of the present invention.
Figure 8:
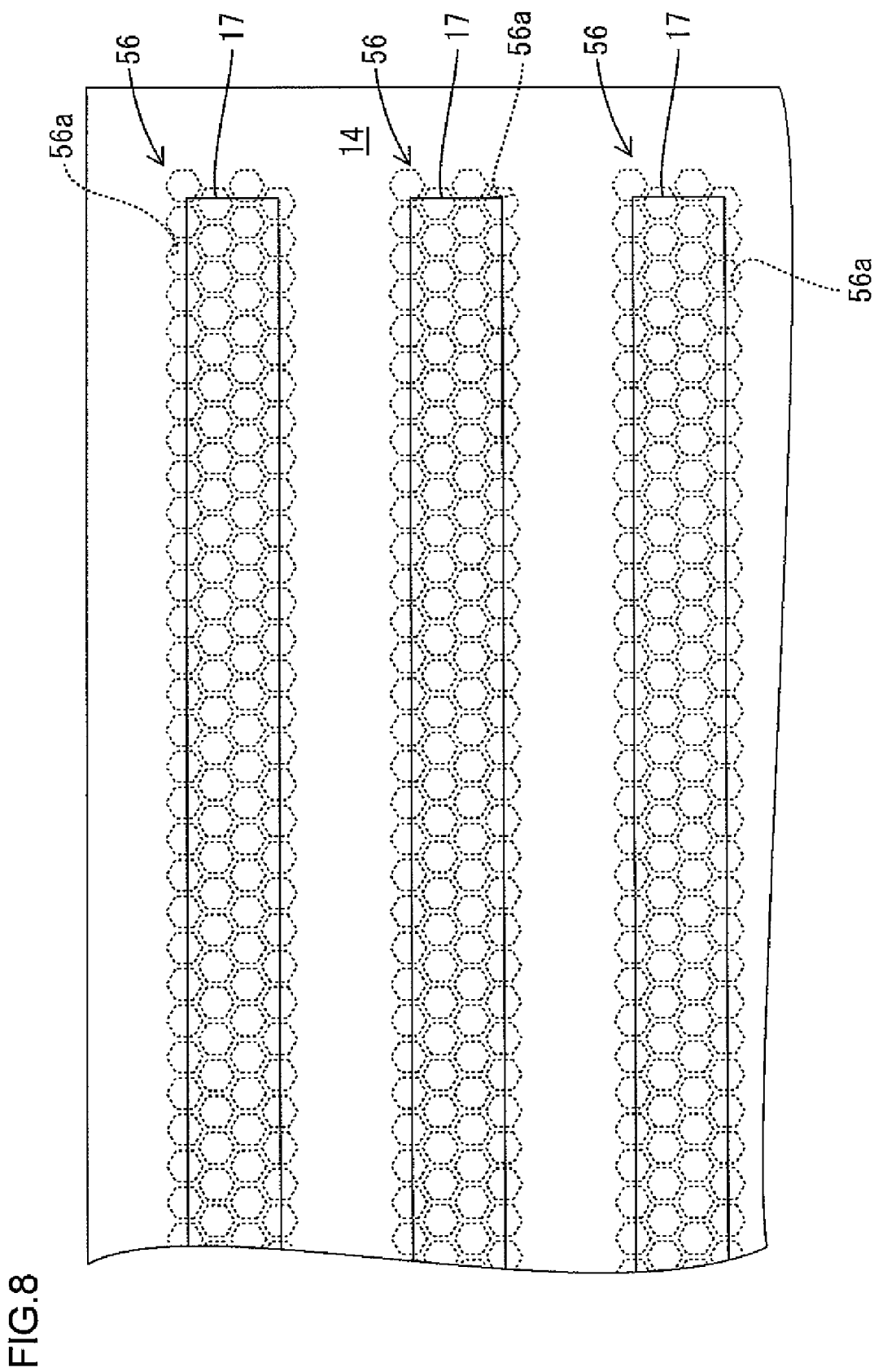
FIG. 8 is an enlarged plan view showing the construction of a chassis applied to the liquid crystal display device shown in FIG. 7.
Figure 9:
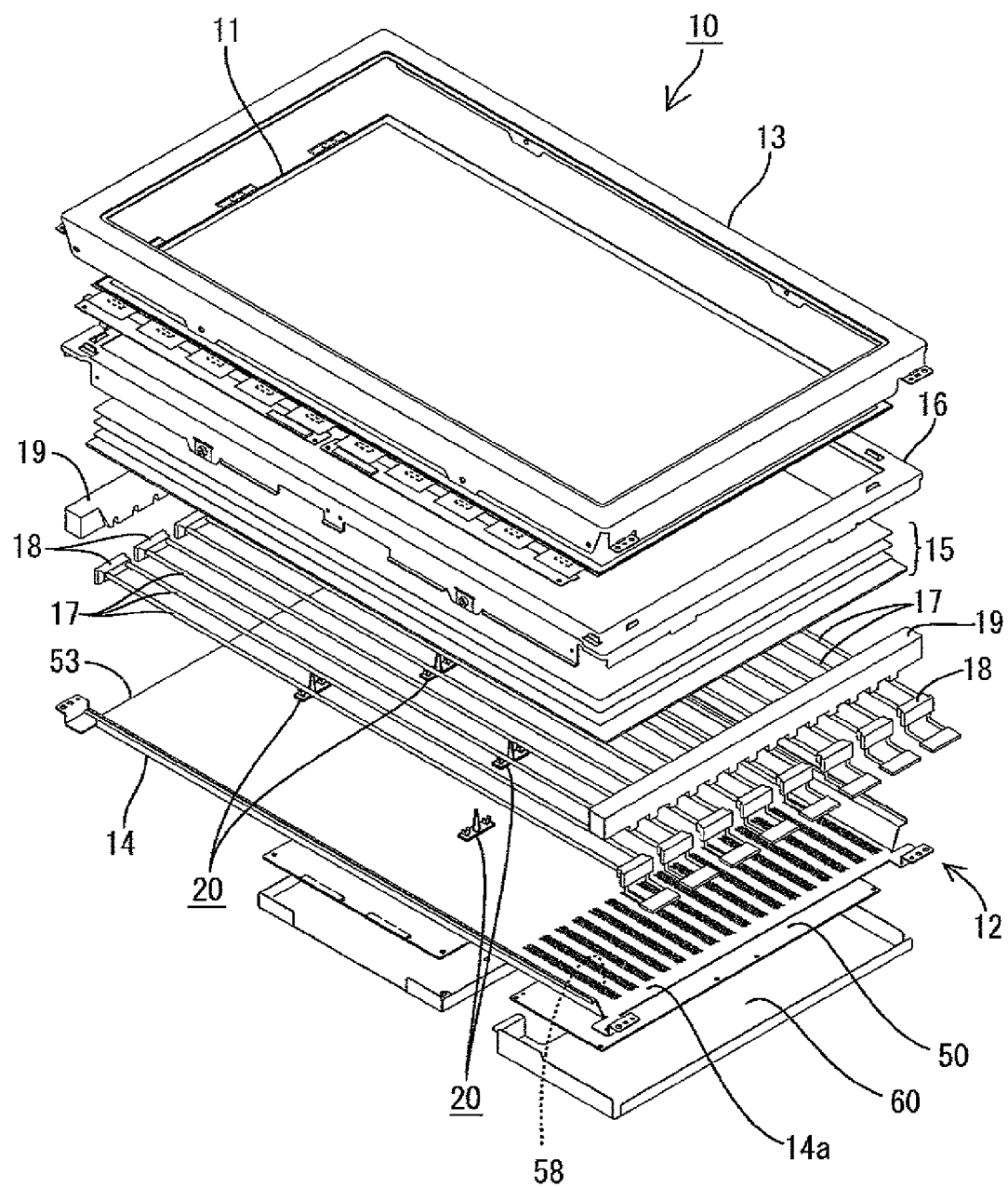
FIG. 9 is an exploded perspective view showing the general construction of a liquid crystal display device as a modification of a preferred embodiment of the present invention.
Figure 10:
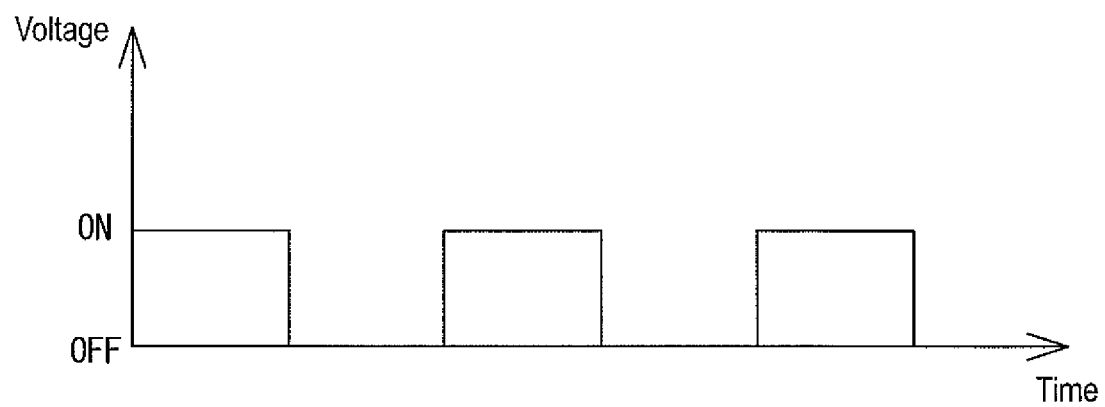
FIG. 10 is an explanatory diagram showing a driving scheme for cold cathode tubes, which is applied to the liquid crystal display device shown in FIG. 1, 7 or 9.

FIG. 1 is an exploded perspective view showing the general construction of a liquid crystal display device according to a preferred embodiment of the present invention. FIG. 2 is a sectional view showing the general construction of the liquid crystal display device. FIG. 3 is a perspective view showing the general construction of a chassis or backlight chassis included in the liquid crystal display device of the present preferred embodiment. FIG. 4 is a perspective view separately showing sheets and the like to be attached to the chassis. FIG. 5 is an enlarged plan view showing the construction of a characteristic portion of the chassis. FIG. 6 is a sectional view of FIG. 5 along the line A-A'. FIG. 7 is an exploded perspective view showing the general construction of a liquid crystal display device as a modification of a preferred embodiment of the present invention. FIG. 8 is an enlarged plan view showing the construction of a chassis applied to the liquid crystal display device shown in FIG. 7. FIG. 9 is an exploded perspective view showing the general construction of a liquid crystal display device as a modification of a preferred embodiment of the present invention. FIG. 10 is an explanatory diagram showing a driving scheme for cold cathode tubes, which is applied to the liquid crystal display device shown in FIG. 1, 7 or 9.

The general construction of the liquid crystal display device 10 according to the present preferred embodiment will be explained first. Referring to FIGS. 1 and 2, the liquid crystal display device 10 preferably includes a liquid crystal panel 11 having a rectangular or substantially rectangular shape, and a backlight device 12 (lighting device for a display device) as an external light source, which are integrally held by a bezel 13 and the like. The liquid crystal panel 11 includes a pair of glass substrates, which are attached to each other so as to face each other while a gap of a predetermined size is kept therebetween. Liquid crystal is sealed between the glass substrates. On one of the glass substrates, components such as switching elements (e.g., TFTs) connected to source wiring lines and gate wiring lines running at right angles to each other, and pixel electrodes connected to the switching elements are provided. On the other of the glass substrates, components such as a counter electrode, a color filter having R, G, and B color sections arranged in a predetermined pattern are provided.

Next, the backlight device 12 will be explained. The backlight device 12 preferably is a so-called direct-light type backlight device that includes a plurality of linear light sources (e.g., cold cathode tubes (tubular light sources) 17 as high-pressure discharge tubes, in the present preferred embodiment), which are positioned directly below the back surface of the liquid crystal panel 11 (i.e., the panel surface on the opposite side of the display side), and are arranged along the panel surface.

The backlight device 12 includes a metallic backlight chassis 14 having a substantially box-like shape with an opening on its upper side, and a plurality of optical members 15 (e.g., a diffuser plate, a diffusing sheet, a lens sheet and an optical sheet, in order from the lower side of the figure) which are arranged to cover in the opening of the backlight chassis 14. Further included are a frame 16 arranged to hold the optical members 15 on the backlight chassis 14, cold cathode tubes or light sources 17 contained in the backlight chassis 14, rubber (e.g., silicon rubber) holders 18 arranged to hold the end portions of the cold cathode tubes 17, lamp holders 19 arranged to collectively cover the cold cathode tubes 17 and the holders 18, and lamp clips 20 arranged to mount and hold the cold cathode tubes 17 on the backlight chassis 14. Note that the optical member 15 side of the cold cathode tubes 17 corresponds to the light emitting side of the backlight device 12.

Each of the cold cathode tubes 17 preferably defines a tubular shape elongated in one direction. A number (e.g., sixteen in FIG. 1) of cold cathode tubes 17 are arranged in the backlight chassis 14 so that the longitudinal direction (or axial direction) thereof conforms with the longitudinal direction of the backlight chassis 14. On the other hand, the lamp clips 20, arranged to mount the cold cathode tubes 17 to the backlight chassis 14, function as clip members for holding light sources, and are preferably made of synthetic resin (e.g., polycarbonate). The plurality of lamp clips 20 are mounted on the backlight chassis 14 so as to support each of the cold cathode tubes 17 at two or three points spaced along the longitudinal direction thereof.

The substantially box-like backlight chassis 14 is preferably defined by a plate-shaped member 53 made of a metallic plate such as an aluminum plate, as shown in FIG. 3. A light reflecting sheet 14a (See FIG. 4) is provided on the inner surface side (light source side) of the backlight chassis 14, which defines a light reflecting surface. The backlight chassis 14 thus includes the light reflecting sheet 14a, and thereby the light from the cold cathode tubes 17 can be reflected to the optical members 15 such as the diffuser plate (hereinafter, sometimes referred to as "the diffuser plate 15 and the like"). The light reflecting sheet 14a can be defined by a resin sheet having light reflectivity, for example.

Referring to FIGS. 5 and 6, the plate-shaped member 53 of the chassis 14 has a reticulated structure 55. The reticulated structure 55 is preferably defined by a honeycomb structure. That is, a plurality of regular hexagonal opening sections 55a are arranged in a hexagonal close-packed structure so as to define a reticulation. The thickness "t" of the plate-shaped member 53 is preferably between about 0.5 mm and about 5.0 mm, for example. An opening ratio (or void density in the reticulated structure), i.e., a ratio of the opening sections 55a to the area of the whole plate-shaped member 53 (e.g., about 1300 sq. mm in the case of a 20-inch liquid crystal panel), is preferably between about 40% and about 80%, for example. When it is less than 40%, slight beat tones may be generated. The void density larger than 80% may cause insufficient strength of the chassis, resulting in deformation due to external impact or heat. The reticulated structure 55 can be made during the sheet processing of the chassis 14. Alternatively, it may be formed by post processing such as punching. The reticulated structure 55 is provided on the inner side of the light reflecting sheet 14a, and therefore is shown by broken lines in FIG. 1.

The light reflecting sheet 14a is provided on the inner surface side of the chassis 14 as described above, while a light blocking sheet 14b is provided on the outer surface side of the chassis 14 as shown in FIGS. 2 and 4. The light blocking sheet 14b is arranged to cover the reticulated structure 55 of the chassis 14, and is bonded or screwed to the chassis 14. The light blocking sheet 14b can be formed of a polycarbonate-resin or acrylic-resin sheet as a molded piece to which light-proof coating material is applied, for example. Further preferably, the light blocking sheet 14b also has resistance to high temperatures, because the cold cathode tubes 17 generate heat.

An inverter board 50 arranged to supply drive voltage to the cold cathode tubes 17 is mounted to the chassis 14, or specifically, mounted on the opposite side of the cold cathode tubes 17 (i.e., on the opposite side of the light emitting surface). The inverter board 50 includes an inverter circuit that generates a high-frequency voltage for lighting the cold cathode tubes 17. Specifically, in the present preferred embodiment, the inverter circuit is connected to one of two end portions of each cold cathode tube 17, and therefore the one end portion is subjected to high voltage during lighting. Referring to FIG. 10, in the present preferred embodiment, the cold cathode tubes 17 are driven by pulse-width modulation (PWM), for example. Thereby, the dimming control is performed in a predetermined cycle.

The liquid crystal display device 10 thus constructed according to the present preferred embodiment can provide the following operational effects. In the liquid crystal display device 10 of the present preferred embodiment, the chassis 14 of the backlight device 12 is preferably defined by a plate-shaped member 53 having a reticulated structure 55. According to the construction, the chassis 14 is much less likely to generate beat tones. The beat tones generated on the chassis 14 may be caused by vibration of the chassis 14. The vibration may result from various factors, and the factors include current leakage from the cold cathode tubes 17.

The chassis 14 is preferably formed of a conductive metal plate, and therefore a capacitor may be formed between the cold cathode tube 17 and the chassis 14. Accordingly, an ordinary construction (not including a reticulated structure 55) may be prone to current leakage from the cold cathode tubes 17 to the chassis 14. A force acting on the chassis 14 can be generated due to the leakage current, which causes the chassis 14 to vibrate resulting in beat tones. Particularly, in the case of pulse-width modulation, the leakage current can be periodic, and therefore a periodic force acts on the chassis 14 so as to generate beat tones.

In contrast, according to the present preferred embodiment, the reticulated structure 55 is provided on the metallic plate-shaped member 53 of the chassis 14, so that the possibility of current leakage described above is minimized. Consequently, beat tones can be prevented or suppressed. That is, when the reticulated structure 55 is thus provided, the distance "d" between the cold cathode tubes 17 and the chassis 14 can be infinitely large at each opening section of the reticulated structure 55, and the area "S" of the chassis 14 (i.e., the area obtained by subtracting the areas of opening sections from the whole area) can be small. Accordingly, the leakage current may be substantially eliminated, which is expressed by the following formula (1):

$$I = 2\pi f \epsilon CV = 2\pi f \epsilon (S/d)V \qquad \text{formula (1)}$$

where "I" is the amount of leakage current, "C" is the stray capacitance, "V" is the potential difference between the cold cathode tubes 17 and the chassis 14, "S" is the area of the chassis 14, and "d" is the distance between the cold cathode tubes 17 and the chassis 14.

It is notable that the plate-shaped member 53 having a reticulated structure 55 as in the present preferred embodiment is basically less likely to generate beat tones, because of structural differences from a flat-plate structure provided solidly on its entire surface (i.e., a flat plate not having opening sections). That is, compared to a chassis formed of a plate-shaped member not having a reticulation, the chassis 14 defined by a plate-shaped member 53 having a reticulated structure 55 is less likely to deform, and therefore is less prone to generating vibration. Thus, the reticulated structure itself can contribute directly to prevention of beat tones. Further, prevention of current leakage is provided as a synergistic effect, and thereby beat tones can be adequately prevented or suppressed.

Particularly, in the present preferred embodiment, the regular hexagonal opening sections 55a preferably are closely arranged, or specifically, arranged in a hexagonal close-packed structure, so as to form a reticulated structure 55. According to the construction, the plate-shaped member 53 has significantly high strength so as to adequately achieve its original purpose or its effect of protecting cold cathode tubes 17, although the reticulated structure 55 is preferably used in the plate-shaped member 53 of the chassis 14 (i.e., the opening sections are provided on the chassis 14). The use of the reticulated structure 55 also contributes to reduction in weight of the chassis 14.

Further, the reticulated structure 55 provided for prevention or suppression of beat tones, as in the present preferred embodiment, enables a simple construction, which contributes to thinning the backlight device 12 and therefore to thinning the liquid crystal display device 10.

Moreover, in the present preferred embodiment, the light blocking sheet 14b is attached to the chassis 14 so as to cover the reticulated structure 55. Thereby, the light passing through the reticulated structure 55 can be prevented or suppressed. Consequently, the quality reduction of the backlight device 12, and therefore of the liquid crystal display device 10, can be prevented or suppressed.

Shown above is a preferred embodiment of the present invention. However, the present invention is not limited to the preferred embodiment explained in the above description made with reference to the drawings. The following preferred embodiments may be included in the technical scope of the present invention, for example, and further the present invention may be embodied in various forms without departing from the scope of the invention.

In the liquid crystal display device 10 shown in FIG. 1, the reticulated structure 55 is preferably arranged to extend over the entire surface of the chassis 14. However, reticulated structures 56 may be selectively arranged to be located directly below the respective cold cathode tubes 17, for example, as shown in FIGS. 7 and 8.

In this construction, each reticulated structure 56 is arranged to have an elongated shape along the axial direction of the cold cathode tube 17, and also includes regular hexagonal opening sections 56a arranged in a hexagonal close-packed structure. The reticulated structures 56 are arranged to have a striped configuration formed of strips along the array of the cold cathode tubes 17. Referring to FIG. 8, each reticulated structure 56 is provided directly below the cold cathode tube 17, so as to have a width larger than the line-width of the cold cathode tube 17 and so as to appear to cover the cold cathode tube 17 when viewed planarly. Specifically, the outer diameter of the cold cathode tube 17 is set to between about 3.4 mm and about 4.0 mm, while the width of the reticulated structure 56 is set approximately to between about 10 mm and about 20 mm, for example.

When the reticulated structures 56 are thus provided to lie directly below and along the respective cold cathode tubes 17, current leakage from the cold cathode tubes 17 to the chassis 14 can be adequately suppressed, and consequently beat tones can be prevented or suppressed. Further, according to the construction, the opening ratio in the reticulated structure can be reduced and thereby higher strength can be secured, compared to using a reticulated structure extending over the substantially entire chassis 14.

Alternatively, referring to FIG. 9, reticulated structures 58 may be arranged to be located directly below the high voltage areas of the respective cold cathode tubes 17. That is, each reticulated structure 58 may be arranged to correspond to a high-voltage-side end portion that is one of the end portions of a cold cathode tube 17 and is located on the side of the inverter board 50, as shown in FIG. 9.

The reticulated structures provided on the chassis 14 may result in disadvantages such as strength reduction of the chassis 14. In view of this, the reticulated structures 58 are solely provided on the areas prone to generating beat tones or on the areas directly below the areas to be subjected to high voltage, as shown in FIG. 9. Thereby, beat tones are effectively prevented while the disadvantages (such as insufficient strength) of providing the reticulated structures 58 are minimized.

In the above preferred embodiments, the backlight device, in which one end portion of each cold cathode tube 17 is arranged to be subjected to high voltage, is shown for illustrative purposes. However, the above construction can be used on a backlight device 12 in which both end portions of each cold cathode tube 17 are arranged to be subjected to high voltage. That is, in this construction, the inverter circuit 50 is connected to both end portions of each cold cathode tube 17, and therefore reticulated structures 58 can be arranged on the chassis 14 so as to be located directly below the respective two end portions of each cold cathode tube 17.

In the above preferred embodiment, cold cathode tubes 17 are preferably used as light sources. However, the present invention can include a construction in which another type of light sources such as hot cathode tubes is used, for example.

In the above preferred embodiments, TFTs are preferably used as switching elements of the liquid crystal display device. However, the present invention can be applied to a liquid crystal display device that uses another type of switching elements than TFTs (e.g., thin-film diodes (TFDs)). Further, the present invention can be applied to a liquid crystal display device for monochrome display, as well as a liquid crystal display device capable of color display.

Moreover, although a liquid crystal display device is shown in the above preferred embodiments, the present invention can be applied to other types of display devices than a liquid crystal type, which use a backlight device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A lighting device for a display device, comprising:
 a light source; and
 a chassis arranged to cover said light source; wherein
 said chassis includes a plate-shaped member having a reticulated structure at least in an area corresponding to an entire plan-view area of said light source, the entire plan-view area being located directly below said light source.

2. A lighting device for a display device, as in claim 1, wherein said plate-shaped member is made of a metallic material.

3. A lighting device for a display device, as in claim 1, wherein said reticulated structure includes a plurality of opening sections each having a hexagonal shape, which are arranged in a hexagonal close-packed structure.

4. A lighting device for a display device, as in claim 1, further comprising a light-blocking sheet attached to said chassis and arranged to cover said reticulated structure.

5. A lighting device for a display device, as in claim 1, wherein said light source is arranged to be driven by pulse-width modulation.

6. A display device comprising:
 a lighting device for a display device, as in claim 1; and
 a display panel for providing display by use of light from said lighting device for a display device.

7. A display device as in claim 6, wherein said display panel is a liquid crystal panel that uses liquid crystal.

8. A lighting device of a display device, as in claim 1, wherein said reticulated structure is provided in an entire area of said plate-shaped member.

9. A lighting device for a display device, as in claim 3, wherein said reticulated structure is arranged such that a ratio of said opening sections of said reticulated structure to an entire area of said plate-shaped member is between 40% and 80%.

10. A lighting device for a display device, as in claim 3, wherein said reticulated structure is arranged such that a width of a connecting portion between adjacent ones of said opening sections of said plate-shaped member is smaller than a thickness of said plate-shaped member.

11. A lighting device for a display device, as in claim 3, wherein:
 said light source is a tubular light source; and
 each of said opening sections has a diameter smaller than a diameter of said light source.

12. A lighting device for a display device, as in claim 11, wherein said reticulated structure is arranged such that a width of a connecting portion between adjacent ones of said opening sections of said plate-shaped members is smaller than the diameter of said light source.

13. A lighting device for a display device, as in claim 11, wherein:
 said tubular light source includes an array of a plurality of tubular light sources arranged parallel or substantially parallel to one another; and
 said reticulated structure has a striped configuration in which said opening sections are arranged in stripe areas of said plate-shaped member, said stripe areas being provided to correspond to said array of said plurality of tubular light sources.

14. A lighting device for a display device, as in claim 13, wherein each of said strip areas has a width larger than the diameter of corresponding ones of said tubular light sources such that said tubular light source is arranged within said strip area.

* * * * *